March 11, 1930. E. W. HOLMES 1,750,598
AUTOMOBILE JACK
Filed Nov. 2, 1925 5 Sheets-Sheet 2

March 11, 1930.  E. W. HOLMES  1,750,598
AUTOMOBILE JACK
Filed Nov. 2, 1925  5 Sheets-Sheet 3

Inventor
Ernest W. Holmes,

By
Attorney

March 11, 1930. E. W. HOLMES 1,750,598
AUTOMOBILE JACK
Filed Nov. 2, 1925  5 Sheets-Sheet 4

Inventor
Ernest W. Holmes,
By
Attorney

Patented Mar. 11, 1930

1,750,598

UNITED STATES PATENT OFFICE

ERNEST W. HOLMES, OF CHATTANOOGA, TENNESSEE, ASSIGNOR TO ERNEST HOLMES COMPANY, OF CHATTANOOGA, TENNESSEE

AUTOMOBILE JACK

Application filed November 2, 1925. Serial No. 66,284.

This invention relates to lifting jacks and particularly to the novel construction of jacks of that type which are especially adapted to the lifting or moving about of automobiles by engagement with the axles thereof.

The objects of the invention are to construct a handle operated jack that can be worked in close quarters by reciprocating the handle, if necessary, in small arcs through a wide range of positions, from that approaching the vertical, to a horizontal position; to provide a jack so low when retracted that it can be placed under an axle supported by flat balloon tires and raise the axle to a height adequate to permit the changing of the largest size tires, with one operation of the jack; to construct a jack which is unusually stable as to its base of support, which is quickly adjustable to initial lifting position; which can be conveniently and rapidly adjusted to the load by auxiliary lifting means operable independently of movements of the handle, so that the latter may be utilized in holding the jack in allocated position beneath the load; which can be pivoted on casters so that it can be swung into position, this being accomplished by locking the handle with respect to the frame and then tilting the jack, which can be swung longitudinally from the front or rear of an automobile to the side thereof beneath the raised wheel, while still supporting the axle in elevated position; which equalizes the power application throughout the entire stroke of the handle; which is foldable into a minimum space when not in use, and which performs all these and many other functions efficiently through coordinated structural elements of utmost strength and simplicity.

Other objects of the invention will appear as the following description of a practical embodiment of my invention proceeds.

Referring now in detail to the several figures, the numerals 1 and 2 represent the side members of the frame which may be of any suitable construction and are preferably arranged in spaced parallel relation at their front and rear portions, and convergent forwardly, at their intermediate portions. The side members 1 and 2 are connected at the back by a rear member 3. In the present illustrative embodiment of the invention this is shown to be a piece of round stock secured in any suitable manner to the side members of the frame.

The side members are supported rearwardly by vehicle wheels 4 and 5 carried upon an axle 6, the latter passing through apertures in the side members. On account of the relative thinness of the stock from which the side members are made it is preferable, in order to avoid excessive wear that the axle be non-rotatable, it being rendered stationary by means of a taper pin 7 driven into suitably shaped registering channels formed on the axle and upon the end member 3. The vehicle wheels are freely mounted upon roller bearings 8 at the ends of the axle 6.

Forwardly the frame is supported by laterally spaced casters 9 and 10 rotatable about vertical spindles 11 and 12 carried by brackets 13 and 14, the latter being formed of angle iron and suitably riveted to the frame members. A stiffening web 15, preferably of channel iron section, is riveted within the frame members between said brackets. It is preferred that the casters rotate upon ball or roller thrust bearings 16.

The frame member 2 terminates forwardly at a point designated by the reference character 17, there being nothing of particular note regarding this end of the frame member, but it will be observed that the forward end of the frame member 1 is notched so as to provide shoulders 18 and 19 the purpose of which will be explained in due course.

Pivotally mounted at an intermediate portion of the frame, that is to say, between the casters and the vehicle wheels is a load lifting lever or member 20. Said lifting lever preferably consists of a hairpin-shaped member having its closed or looped end oriented toward the rear of the jack.

The load lifting lever 20 supports the lifting platform 21ᵃ at its free end, the latter being swivelly mounted upon the post 22. The details of construction of the lifting platform and post need not here be dwelt upon as the same differ in no respect from the like elements illustrated in my Patent No. 1,544,006, granted June 30, 1925. The post 22 reciprocates in a guideway formed by the looped portion of the load lifting lever and by a flat cross-piece 23 which bridges the space between the sides of the load lifting lever adjacent its looped end. The shape of the post conforms to that of the guide-way, which parts being non-circular, prevent the post from rotating. The flat side of the post is provided with teeth 24 engageable by a pawl 25, the object of which is to retain said post in any of various positions of elevation. The pawl 25 may be formed in any desired manner but a cheap and efficient pawl may be made by bending a flat metallic sheet into a configuration similar to that shown in Figure 7 and pivotally mounting it upon one of the rivets or bolts 26 which secures the cross-piece 23 to the sides of the load lifting lever. The pawl 25 includes a pedal 34 and is normally urged into engagement with the flat side of the post by means of a wire spring 27. This spring is preferably formed with a loop 28 engaging the under surface of the pedal portion 34, the sides of said loop being wound around any suitable support such as the pin 29 (the principal function of which will presently be described). The ends of said spring are angularly bent so as to overlie the top edges of the sides of the load lifting lever as indicated at 30 and 31 in Figure 4. The lifting platform is elevated by hand to any desired height before placing the jack in position beneath the object to be raised and is released, so that it may descend by gravity after the load has been removed therefrom, by pressing upon the pedal portion 34 thereby tilting the pawl 25 away from the teeth against the tension of the spring.

The free or lifting end of the load lifting lever is supported by a pair of lifting rockers 32 and 33 pivotally mounted at their upper extremities upon the projecting ends of the pin 29 which passes transversely through the load lifting lever. Each of the lifting rockers consists of a web 36 lying in a vertical plane and provided with a broad curved supporting flange 37 extending laterally on the outside thereof, the elements of said flange being perpendicular to said web. The lifting rockers rest with said flanges in contact with a roller 38 which bridges the space between the side frame members 1 and 2 and is carried by roller bearings upon a stationary shaft 39 supported by the side frame members. The load carried by the jack is transmitted through the load lifting lever to the lifting rockers and thence to the roller 38 and to the frame members. In order adequately to reinforce the latter at the point of application of the load, the angular face plates 40 are provided, having face portions which contact with the inner vertical faces of the side members, and flanges which extend above and below the side members and are turned over as indicated at 41 so as to cause the face plates irremovably to engage the side members. The face plates also serve as spacing members for preserving a proper degree of clearance between the lifting rockers and the side members of said frame.

Figure 9:
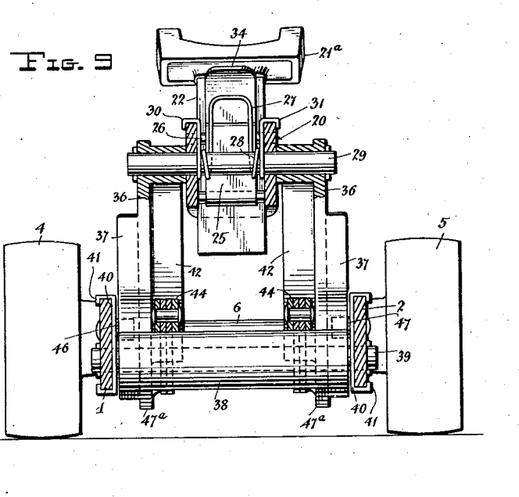
Figure 9 is a section taken along the line 9—9 of Figure 1.
Figure 10:
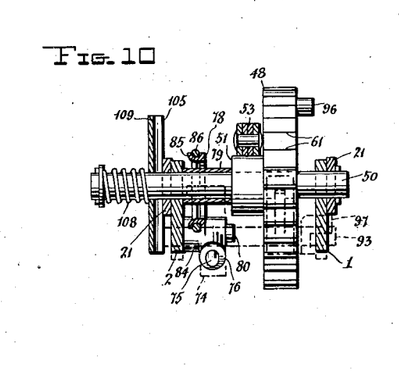
Figure 10 is a section taken along the line 10—10 of Figure 2.

It will be observed from the transverse section shown in Figure 9 that the lifting rockers are spaced apart a sufficient distance to provide an adequate base of support for the lifting platform 21ᵃ. Even though the load imposed upon the jack be carried solely by one of the corners of the lifting platform while the latter is turned with its diagonal dimension transversely of the jack, a line dropped from the load-supporting corner would fall well within the base of support determined by the flanges of the lifting rockers. The rocking levers also co-act with the load lifting lever at points substantially directly below the point of application of the load, affording rigid support for said load lifting lever and preventing any tendency of the latter to move sidewise.

The web 36 of each of the lifting rockers is provided on its inner side with a curved flange 42. Said flange is positioned intermediately wth respect to the upper and lower edges of said web and is therefore located at a higher elevation upon said web than is the flange 37. A shaft 43 extends between the lifting rockers, having shouldered ends passing through apertures in the webs of said rockers adjacent their lower ends, those portions of said shaft which lie beneath the flanges 42 forming a means for the attachment for the chain 44. Said chain bears against the under surface of the flange 42 and passes over the roller 38, the forward end of said chain being suitably attached to a pull rod 45 which makes connection with actuating means presently to be described. When the chain 44 is pulled in a forward direction the lifting rocker performs a camming action against the roller 38, the upper end of said lifting rocker being erected toward the vertical and carrying with it the free end of the load lifting lever. That part of the chain which engages the lower face of the flange 42 shares with the roller 38 in the support of the load on the lifting platform. The curvature of the lower face of the supporting flange 37 is designed with a view to having the lifting rocker clear the ground beneath the axle 6 when the load lifting lever is lowered. The web 36 is made as wide as possible in the interest of strength, but its thickness tapers somewhat toward the lower end of the lifting rocker so as to enable it to clear the axle.

Notwithstanding the ample width of the base of support afforded by the distance apart of the lifting rockers and the breadth of the supporting flanges 37, means are provided to safeguard the lifting mechanism against overturning or tilting relative to the frame of the jack, should the latter at any time be operated while on an uneven surface, such as the side of a hill. These means consist of inwardly projecting studs 46 and 47 fixed to the side members of the frame adjacent the ends of the roller 38, and overhanging the flanges 37, the latter passing between said roller and said studs with a slight clearance which, for example may be about one thirty-second of an inch. This clearance limits the tilting movement of the lifting mechanism, the studs acting as stops to prevent further tilt of said flanges 37. On account of the curved shape of the lifting rockers it is essential that the thickness of the flanges 37 be gradually tapered toward the upper part of the lifting rockers so as to provide a uniform clearance. The lower ends of the lifting rockers are formed with projections 47ª which engage the roller 38, determining the lifting limit of the jack and acting as a stop to prevent excessive elevation thereof.

A ratchet wheel 48 is journalled by means of suitable anti-friction bearings 49 upon a stationary rod 50 arranged transversely of the side members of the jack adjacent their forward ends. Said shaft also affords a pivotal support for the jack handle 21, the latter and parts carried thereupon being involved in the operation of the ratchet wheel and its attending mechanism. The ratchet wheel is provided on one side with a hub 51. A stud 52 projects from one side of said ratchet wheel above said hub to which stud the chain 53 is connected. This chain is of sufficient length to extend one complete revolution about the hub 51 when the lifting rockers are in the most elevated position. The chain 53 is connected to the hereinbefore mentioned pull rod 45.

It may now be readily understood that by turning the ratchet wheel in one direction the chain 53 winds upon the hub 51, drawing the pull rod 45 forwardly, thereby exerting a pull upon the chain 44, which advances the lower ends of the lifting rockers causing said rockers to cam upon the roller 38, the rockers climbing upwardly and toward erect position, thereby raising the load lifting lever.

Figures 1, 4:
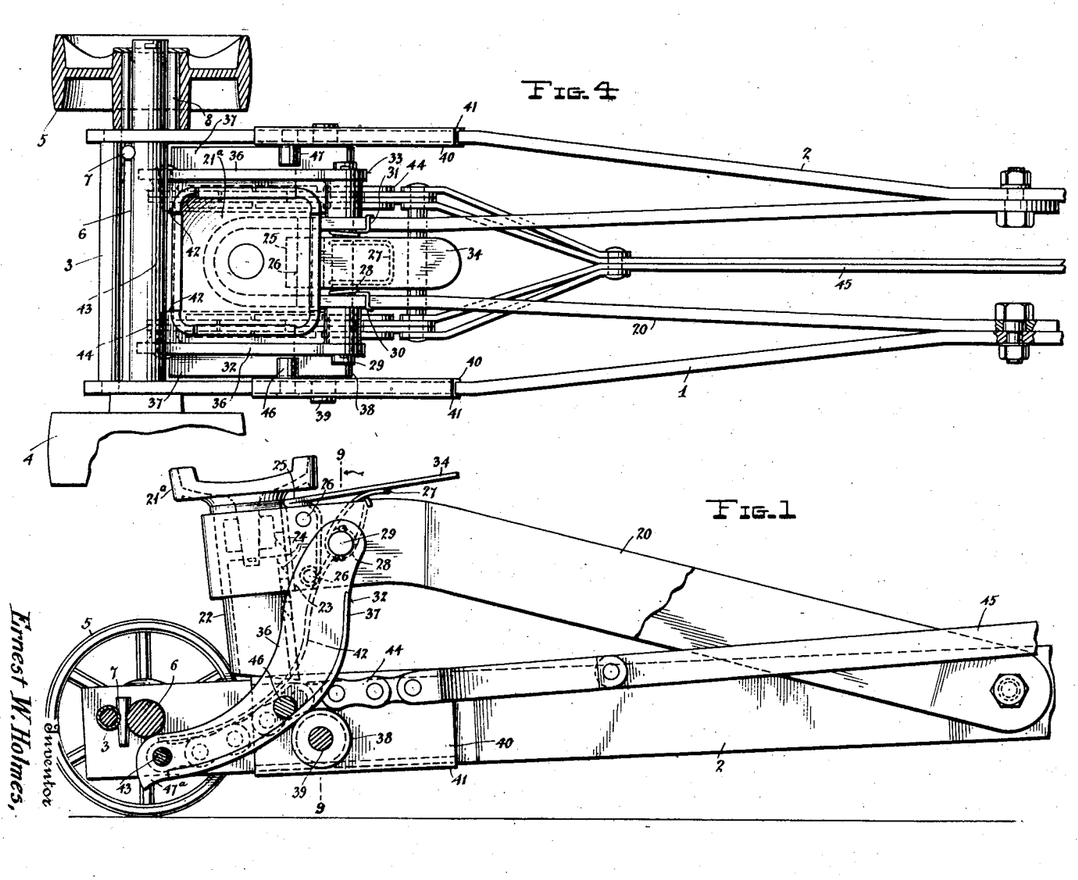
Figures 1, 2 and 3 represent consecutive sections of a side elevational view of my improved lifting jack, Figure 1 showing the lifting platform in an intermediate position of elevation, Figure 2 representing the lifting mechanism with the parts in the position assumed during elevation of the jack and Figure 3 representing a section of the handle with the operative controls in position corresponding to the position of parts in Figures 1 and 2.
Figures 4, 5 and 6 are consecutive partial plan views, which together show a plan view of the jack.
Figure 7:
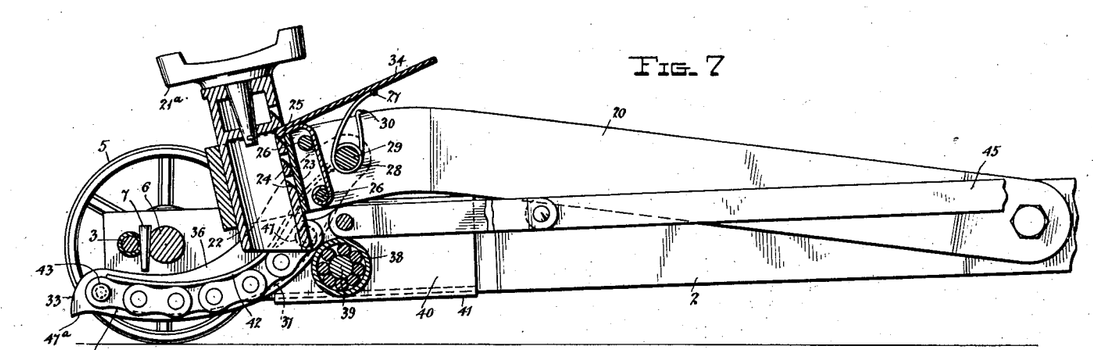
Figure 7 is a side elevational view similar to that shown in Figure 1, but showing the lifting platform in fully retracted position.

Different positions of the lifting rockers are illustrated respectively in Figures 1 and 7. It will be observed from an inspection of these figures that the curvature of the rockers is designed to permit an almost constant force being applied to the jack throughout its entire operative range, said curvature departing from this ideal curve only to the extent of permitting the rockers to pass under the axle. This departure necessitates for the lifting of the same load, a greater power application at the beginning of the lift than at a later period in the lifting operation. In order to compensate for this slight variation in constancy in the required operating pressure, and to render the power applied to the handle constant throughout the lifting stroke, I have made the hub 51 slightly eccentric with respect to the axis of rotation of the ratchet wheel, the point of least eccentricity being in a radial line with the stud 52. This places the point of application of power a little closer to the center at the beginning of the lifting movement than later, as the chain 53 winds around the hub, so that a greater mechanical advantage is realized at starting and a proportionately less amount of power required than would be the case in the absence of the novel hub construction. The eccentricity of the hub is preferably of such degree as exactly to compensate for the increase in the mechanical advantage of the lifting rockers as the lifting operation progresses. While this is a feature of the invention which I desire fully to protect, yet in practice I have found that there is so little noticeable difference in the relative amounts of power required in starting the lifting, and later on as the elevation of the load progresses, that the omission of compensating means does not constitute a material deficiency in the practical embodiment of my invention.

Figures 2, 5:
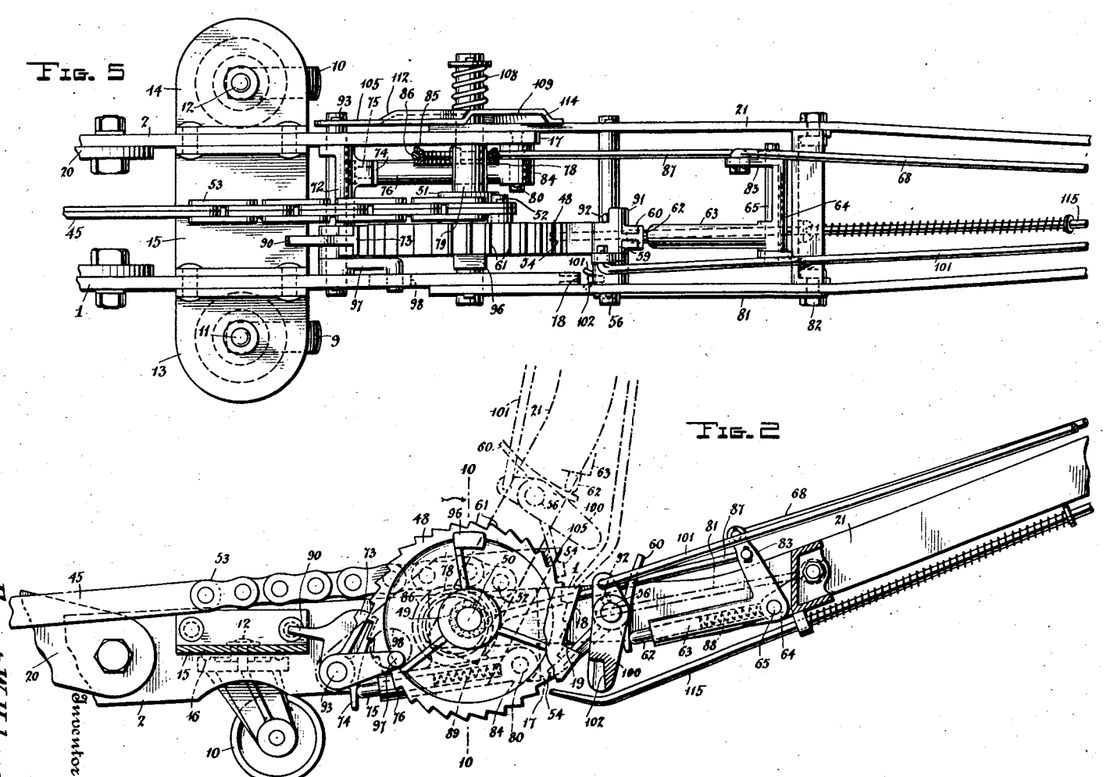
Figures 3, 14:
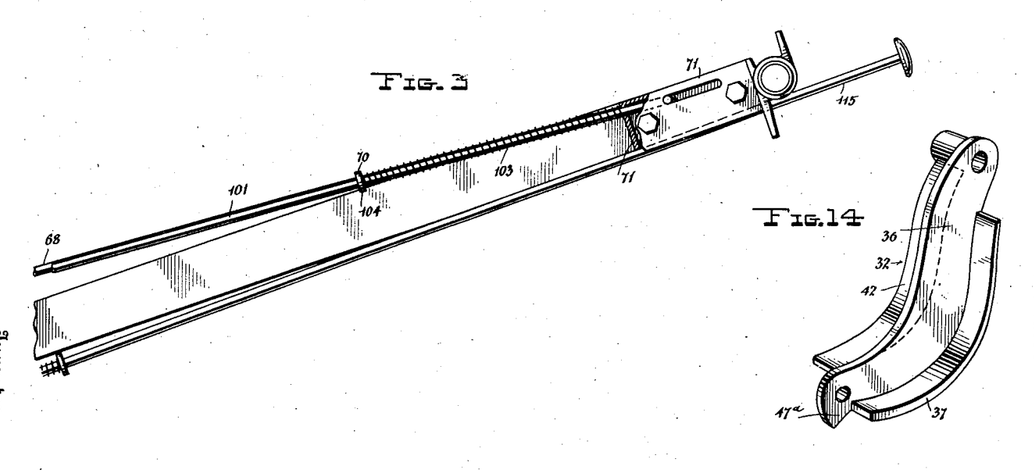
Figure 14 is a perspective view of one of the lifting rockers.
Figure 6:
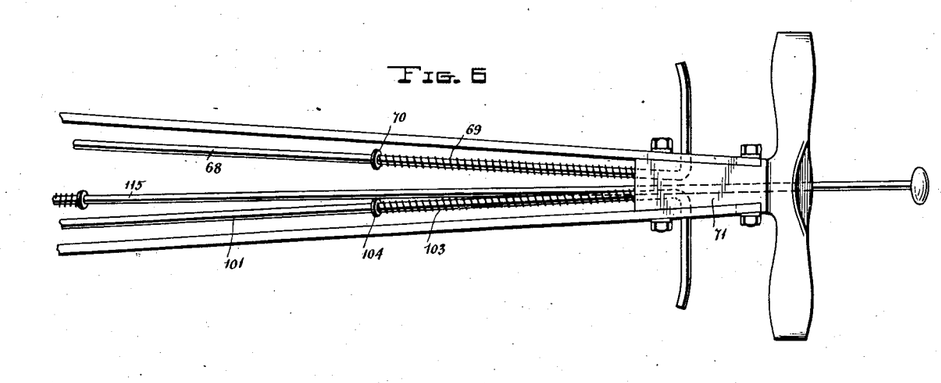

The ratchet wheel 48 is controlled by two pawls, engageable with teeth 61 on said ratchet wheel. The construction of the pawls is in most respects similar, each pawl being fixed to or formed integrally at one end of a sleeve, there being an integral detent plate at the other end of said sleeve. The lifting pawl 54, for instance, is formed at one end of a sleeve 59, the latter being mounted upon a stationary rod or bolt 56 which bridges the side members of the handle and extends through the aligned apertures in said sides. It is preferable that the rod 56 should not rotate and it is therefore held against rotation by means of a key 81, one end of which is passed through a hole in a projecting end of said rod, the other end of said key being anchored around a bolt 82 fixed to the handle. A detent plate 60 is formed on the sleeve 59 adjacent the end thereof which is opposite the pawl 54, said plate being engageable by a spring-pressed plunger 62, the latter being housed within the hollow barrel 63 forming one of the arms of the bell crank lever 64, said lever being pivotally mounted between the side members of the handle upon the shaft 65. A control rod 68 is attached to the other arm 83 of the bell crank and rocks the latter when the control rod is reciprocated so as to move the plunger 62 along the detent plate from one side of the axis of rotation of the sleeve 59 to the other, thereby tending to tilt the pawl 54 either into or out of teeth-engaging position with respect to the ratchet wheel 48. The control rod 68 is normally biased downwardly, that is to say in a direction toward the ratchet wheel by means of a spring 69 which is held under compression between a collar 70 upon the control rod 68 and the head 71 of the jack handle. In this position the plunger 62 presses against the lower end of the detent plate 60, as shown in Figure 2 placing the pawl 54 in teeth-engaging position. The jack handle is pressed downwardly when the lifting pawl is so positioned, thereby rotating the ratchet wheel and imparting a lifting movement to the jack.

Figures 8, 12, 13:
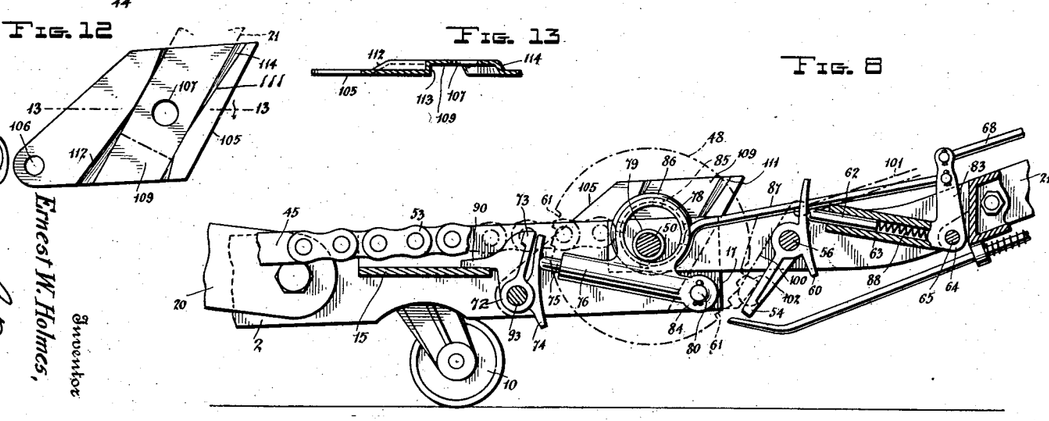
Figure 8 is a side elevation of an intermediate portion of the jack showing the pawls in the position of release.
Figure 12 is a side elevation of the keeper plate for the handle of the jack.
Figure 13 is a section taken along the line 13—13 of Figure 12.

The holding pawl 73 is formed at one end of a sleeve 72, the other end of which sleeve carries a detent plate 74, said sleeve being journalled upon a fixed rod 93. A spring-pressed plunger 75 co-acts with said detent plate and, depending upon its position, urges said pawl into or out of teeth-engaging position with respect to the ratchet wheel. The plunger 75 is carried in a barrel-shaped arm 76 of a bell crank lever 84, which is pivotally mounted upon a stud 80 carried by one of the frame members of the jack. The other arm of said bell crank is made in the form of a ring-shaped extension 78 which surrounds the rod 50 upon which the ratchet wheel is journalled and is of a size considerably larger than said rod and the spacing sleeve which surrounds it, so that the barrel-shaped arm 76 and with it the detent plunger 75 may be oscillated through a range of movement permitted by the difference in the diameters of the spacing sleeve 79 and the internal diameter of said ring-shaped extension. The pivotal axis of the bell crank lever 84 is eccentric with respect to the axis of the ratchet wheel 48, and is preferably so placed that the direction of greatest lost motion between the spacing sleeve and ring-shaped extension, when the bell crank lever is oscillated, will bisect the angle representing the extreme operating range of the jack handle. This assures that for any position of the jack handle there will be ample lost motion between the ring-shaped extension 78 and the spacing sleeve 79 to properly shift the detent plunger 75 from one side of the detent plate 74 to the other. The ring-shaped extension is formed with a groove 85 in which loosely seats the looped end 86 of a control rod 87. Said control rod is pivotally connected to the arm 83 of the bell crank lever 64, and therefore moves synchronously with the control rod 68. That is to say, when the control rod 68 is manually pulled against the tension of the spring 69 both the bell crank 64 and the bell crank 84 are rocked into the released position for both the lifting and holding pawls. This position of each pawl is shown in Figure 8 but it is to be understood that the pawls never simultaneously assume this position in practice unless there is absolutely no load upon the jack. The springs 88 and 89 by means of which the plungers 62 and 75 are urged outwardly are of a degree of tension that will be exceeded by the frictional pressure of the abrupt shoulders of the teeth of the ratchet wheel 48 against the noses of the respective pawls, when the jack is operating under load. For instance, when the holding pawl is in contact with one of the teeth of the ratchet wheel at the end of a lifting stroke of the jack handle, with a load upon the jack, the frictional resistance between the nose of said pawl and the tooth which it engages will be so great as to thwart the effort of the spring 89 to throw out the holding pawl even though the plungers be thrown to pawl-releasing position. To release the holding pawl while the jack is under load requires that the load be transferred to the lifting pawl by slightly depressing the jack handle before pulling the control rods 68 and 87 to pawl reversing direction. When said control rods are so pulled, with the load transferred to the lifting pawl, it is obvious that the holding pawl only will be thrown out and that the lifting pawl will remain in engagement with the ratchet wheel teeth due to the excess force of the friction between said pawl and the tooth which it engages over the force of the plunger spring 88. The holding pawl 73 is preferably formed with a tail 90 which engages the web 15 when the holding pawl is released to prevent its dropping over backwards. The lifting pawl 54 is restrained from falling too far in release position by means of a lug 91 formed on said pawl which engages a pin 92 carried fixedly by the non-rotatable rod 56.

The operation of the lifting mechanism of the jack may be readily comprehended from the structure that has already been described. The control rod 68 being left untouched, the lifting and holding pawls 54 and 73 respectively will remain in normal teeth-engaging position as shown in Figure 2. The handle of the jack is then depressed, the lifting pawl engaging the abrupt shoulders of the teeth of the ratchet wheel causing partial rotation of said wheel with a consequent winding of the chain 53 with a resultant pull upon the pull rod 45 and elevation of the lifting rockers, the load lifting lever together with the platform carried thereby being in this manner raised. Meanwhile the holding pawl 73 has been slipping over the sloping faces of the teeth of the ratchet wheel under the resilient pressure of the plunger 75. As many up and down strokes of the jack handle may be made as are necessary to lift the load the required height, without the need of manipulating the control rod 68. When there is space to manipulate the jack handle throughout its entire range of movement elevation of the load to maximum height is accomplished by a series of strokes of maximum amplitude.

It is clear from Figure 2 that the jack handle, functioning as an elevating lever may be worked in small arcs through any range of positions from one approaching the vertical as indicated in dotted lines to a position substantially horizontal.

When it is desired to lower the jack, the handle is depressed a very slight distance, in order to take the load off of the holding pawl 73. Then the control rod 68 is pulled, biasing the plungers 62 and 75 to the release sides of their respective detent plates. This will have no effect upon the lifting pawl, for the frictional pressure of said pawl against the tooth of the loaded ratchet wheel which it engages overcomes the tension of the plunger in a manner heretofore explained, rendering said plunger ineffective in performing its function. The holding pawl, however, being freed from the load of the ratchet wheel flies out to release position. The jack handle is then permitted to rise, permitting the ratchet wheel to turn in the unwinding direction of the chain 53. When the jack handle has reached the most elevated position available under the circumstances the load is rested by letting go the control rod 68, whereupon the pawl 73 falls back into teeth-engaging position and further rotation of the ratchet wheel in an unwinding direction is inhibted. Successive backward strokes of the jack handle in lowering the load are performed by first lowering the handle a short distance to transfer the load to the lifting pawl and then pulling out the control rod 68 to release the holding pawl. It is impossible for the load to escape from the operator of the jack, for should the handle fly out of his grasp the control rod will automatically return the holding pawl to operative position through the agency of the spring 69.

Operation of the jack beyond the extreme limits of movement of the lifting platform is prevented by a safety device consisting of a lug 96 formed on the outer face of the ratchet wheel adjacent the frame, and a stop 97 carried by the frame and in the path of said lug in either direction of rotation of the ratchet wheel. The stop might have consisted merely of a fixed stud, but by preference the stop has been pivotally mounted relative to the frame upon the rod 93 and formed with an off-set portion projecting through a hole 98 in said frame, said hole having a diamter equal in length to the diameter of the stop plus the length of the lug 96. The purpose of this is to enable the ratchet wheel to make substantially a complete revolution thereby securing the maximum lifting range of said jack. It is apparent that were the stop fixed the ratchet wheel could not make a complete revolution but only an arcuate movement equal to 360° less the length of the lug 96, but by the present construction the stop after being engaged by the lug moves with the ratchet wheel through a distance equal to the length of said lug.

In an earlier part of the present description, attention was called to the fact that the side member 1 of the frame is notched at its forward end so as to provide shoulders 18 and 19. The object of this feature will now be explained. It is frequently desirable to swing the jack about some pivotal point into position beneath the load which is to be elevated. For the accomplishment of this mode of operation I have provided means whereby the forward end of the jack may be tilted upwardly so that the jack teeters upon the casters 9 and 10 and may then be turned laterally in either direction upon the casters as a pivot. To enable this to be done it is essential that the jack handle be made temporarily rigid with the frame of the jack. Said handle has therefore been provided with a latch 100 pivotally mounted upon any convenient support, the rod 56 being here selected for this purpose. The latch 100 is controlled by an operating rod 101. Said latch is formed with a notch 102 which is capable of engagement with either of the shoulders 18 or 19 when the latch is in operative position, the shoulder 18 being engaged when the jack handle is in a substantially vertical position, and the shoulder 19 being engaged when the jack is used under low overhanging objects such as truck bodies, tire carriers or running boards, more nearly horizontal. By pulling upon the operating rod 101 the notched end of the latch moves into a position to engage one of said shoulders and when the jack handle is depressed said handle becomes rigidly latched relatively to the frame of the jack so that further depression of said handle results in a tilting of the forward end of said frame. During the normal lifting or lowering movements of the jack handle the operative rod 101 is left untouched, the latch being normally maintained in inoperative position by means of a spiral spring 103 which surrounds the operating rod and is held in tensioned relation between the collar 104 on said rod and the head 71 of the jack handle.

Figure 11:
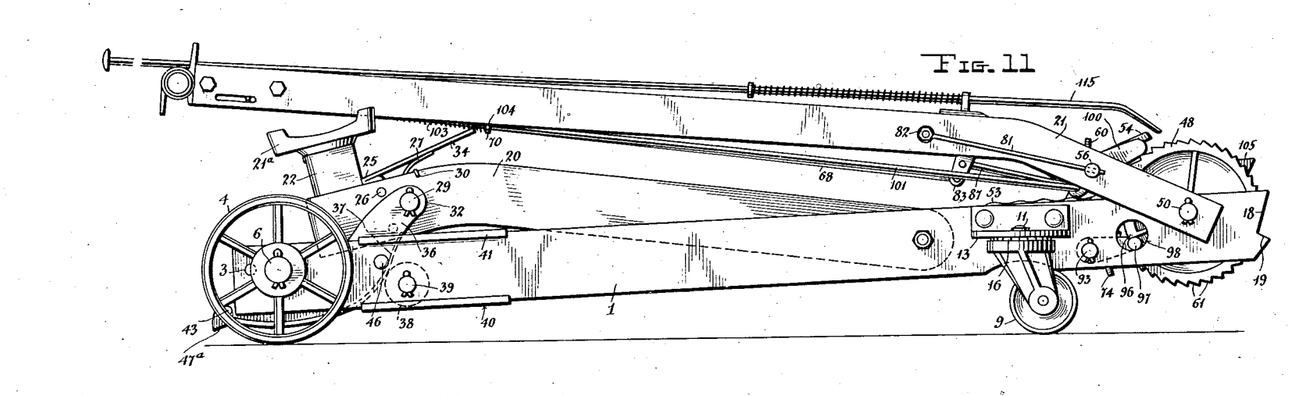
Figure 11 is a side elevation of the jack showing the handle in folded relation thereto.

When the jack is not in use the handle may be retained at a convenient angle by means of the keeper plate 105, said plate being preferably mounted outside of one of the frame members and apertured at 106 and 107 (see Fig. 12) so that it can be passed over the projecting ends of the rods 50 and 93 and thereby located on the frame member, while at the same time being movable endwise with respect to said rods. A spring 108 is retained upon the rod 50 in compressive relation to the keeper plate, normally biasing it toward the jack handle. Said keeper plate is formed with a channel 109 the sides of which are substantially parallel to a line radiating from the axis of rotation of the jack handle at the angle which it is desired that said handle should occupy when in a state of repose. The keeper plate bears resiliently against the lower end of the jack handle and when the latter is pushed upwardly to a position of registry with the channel 109 the keeper plate springs over the jack handle retaining it in position. It will be noted from Figure 12 that the forward wall of the channel 109 is chamfered at the top as indicated by the reference numeral 111 and that the rearward wall of said channel is chamfered at 112 adjacent the bottom, the object of said chamfered portions being to provide inclined planes with which the front and back edges of the jack handle may engage for forcing the keeper back against the tension of the spring 108 when the jack handle is pulled forward. It will be observed also particularly from Figure 13 that the rearward wall 113 is abrupt, that is to say almost but not quite perpendicular to the bottom wall of said channel, while the forward wall 114 slopes more gently. The abrupt end of the rearward wall makes it possible to push the jack while the handle thereof is in position of repose, without the handle becoming disengaged from the keeper plate, but at the same time, there is sufficient slope to said abrupt wall to permit the forcing of the handle past said wall and out of the control of said keeper plate when it is desired to fold the handle upon the jack in the position shown in Figure 11.

The present form of jack is provided with the quick elevating feature described in my patent hereinbefore referred to by means consisting of a pawl rod 115, cooperable with the teeth 61 upon the ratchet wheel and worked independently of movements of the jack handle, so that the latter can be utilized to hold the jack beneath the load while the pawl rod is manipulated to bring the lifting platform quickly into contact with the load.

While I have herein shown and described what I believe to be an efficient and practical embodiment of my invention it is to be understood that equivalent mechanical movements may be substituted for those which I have utilized, without departing from the spirit and scope of the invention as defined in the appended claims.

Having described my invention what I claim as new and desire to secure by Letters Patent, is:—

1. A lifting jack including a frame, a lever, pivotally supported and constructed to carry a load at its free end, elevatable means, pivotally connected to said lever adjacent to the free end thereof, means extending longitudinally from the free end of said lever to the opposite end thereof for operating said elevatable means, said elevatable means being curved so as to maintain substantially constant the lifting component of the force applied to said operating means, and means carried by said frame against which said elevatable means cams for changing the direction of movement of said elevatable means.

2. A lifting jack including a substantially horizontal frame, a lever pivotally supported thereupon and carrying a load-engaging element at its free end, an axle supporting said frame beyond the free end of said lever in spaced relation to the ground, elevatable means mounted substantially below the free end of said lever and operative to raise it, means movable longitudinally of the frame and in substantially the same horizontal plane therewith for operating said elevatable means to elevate said lever, said elevatable means being curved so as to maintain substantially constant the lifting component of the force applied to said operating means, and means carried by said frame against which said elevatable means cams for changing the direction of movement of said elevatable means.

3. A jack including a lever pivotally supported and constructed to carry a load at its free end, elevatable means attached at its upper end to said lever adjacent the free end thereof for raising said lever, means attached to the lower end of said elevatable means for operating the latter, said elevatable means being curved so as to maintain substantially constant the lifting component of the force applied to said operating means, and abutment means carried by said jack against which said elevatable means cams for changing the direction of movement of said elevatable means.

4. A jack including a frame, a lever pivotally supported thereupon and constructed to carry a load at its free end, an axle supporting said frame adjacent the free end of said lever, in spaced relation to the ground, elevatable means attached at its upper end to said lever adjacent the free end thereof for raising the lever, means attached to the lower end of said elevatable means for operating the latter, said elevatable means being curved so as to maintain substantially constant the lifting component of the force applied to said operating means, and abutment means carried by said frame against which said elevatable means cams for changing the direction of movement of said elevatable means.

5. A jack including a lever, pivotally supported and constructed to carry a load at its free end, elevatable means attached at its upper end to said lever adjacent the free end thereof for raising the lever, flexible means attached to the lower end of said elevatable means for operating the latter, said elevatable means being curved so as to maintain substantially constant the lifting component of the force applied to said operating means, and means against which said elevatable means cams for changing the direction of movement of said elevatable means.

6. A jack including a lever pivotally supported and constructed to carry a load at its free end, elevatable means for raising the free end of said lever, a roller against which said elevatable means cams for changing the direction of movement of said elevatable means, and flexible means attached to the lower end of said elevatable means and passing over said roller for operating said elevatable means, the latter being curved so as to maintain substantially constant the lifting component of the force applied to said flexible means.

7. A lifting jack including a load lifting element pivotally supported toward one end and having a load-engaging element connected thereto toward its free end, an axle supporting said element at a point adjacent the line of gravital force passing through the center of mass of the load on said load-engaging element, elevatable means substantially directly below said load-engaging element for raising said load lifting element, said means being curved longitudinally and movable in a path substantially concentric with its said curvature to assume a relatively supine attitude when the load lifting element is down, and means against which said curved elevatable means cams when operated, to raise the load lifting element whereby said elevatable means is caused to assume a relatively erect position.

8. A lifting jack including a frame, a load lifting element pivotally supported on the frame, arcuate elevatable means for raising said load lifting element, said means being arranged to assume a relatively supine attitude in nested relation with the frame when the load lifting element is down, operating means for said elevatable means movable longitudinally of and in substantially the same horizontal plane with said frame, and means against which said elevatable means cams when operated, to raise the load lifting element, whereby it is caused to assume a relatively erect position.

9. A lifting jack including a frame having side members, a lever pivotally supported by said frame and having a load engaging element connected to its free end, arcuate elevatable means mounted on the frame for raising the free end of said lever and load-engaging element, said means being arranged to assume a relatively supine attitude between the side members of the frame when said lever is down, operating means for said elevatable means movable longitudinally of and in substantially the same horizontal plane with the side members of the frame and means against which said elevatable means cams when operated in a direction to raise the lever, whereby it is caused to assume a relatively erect position.

10. A jack including a lever pivotally supported and constructed to carry a load at its free end, elevatable means for raising the free end of said lever, said means being arranged to assume a relatively supine attitude when said lever is down, a roller against which said elevatable means cams when operated in a direction to raise the lever whereby said elevatable means is caused to assume a relatively erect position, and flexible means attached to the lower end of said elevatable means and passing over said roller for operating said elevatable means.

11. A lifting jack including a frame having spaced side members, a load-lifting element carried by said frame, a roller carried by said frame between said side members, a lifting rocker pivotally attached adjacent one end to said load-lifting element, and resting upon said roller, said lifting rocker being constructed to assume a relatively supine attitude when said load-lifting element is down, and flexible means attached to the lower end of said lifting rocker for drawing the latter, by interengagement with said roller into a relatively erect position, thereby raising said load-lifting element.

12. A lifting jack including a frame having spaced side members, a load-lifting element carried by said frame, an arcuate lifting rocker pivotally attached adjacent one end to said load-lifting element, and having a concentric flange at a side thereof, said lifting rocker being constructed to assume a relatively supine attitude between the side members of the frame when said load-lifting element is down, a projection on the frame cooperative with said flange on the lifting rocker to prevent lateral tilting of said lifting rocker relative to said frame, and means cooperative with said lifting rocker for moving the rocker in a path substantially concentric with said flange thereon into a relatively erect position thereby raising said load-lifting element.

13. A lifting jack including a frame having spaced side members, a load lifting element carried by said frame, abutment means also carried by said frame between said side members, lifting means pivotally attached adjacent one end to said load lifting element, and resting against said abutment means, said lifting means being provided with flanges to prevent lateral tilting of said lifting means relative to said frame, said lifting means being constructed to assume a relatively supine attitude when said load lifting element is down, and means attached to the lower ends of said lifting means for drawing the latter, by engagement with said abutment means into relatively erect position, thereby raising said load lifting element.

14. A lifting jack including a frame having spaced side members, a load lifting element carried by said frame, abutment means also carried by said frame between said side members, lifting means pivotally attached adjacent one end to said load lifting element and resting against said abutment means, said lifting means being provided with flanges, means on said frame overhanging said flanges to prevent lateral tilting of said lifting means, said lifting means being constructed to assume a relatively supine attitude when said load lifting element is down, and means attached to the lower ends of said lifting means and passing over said abutment means for drawing said lifting means by engagement with said roller into a relatively erect position, thereby raising said load lifting element.

15. A lifting jack including a frame having spaced side members, a load-lifting element carried by said frame, a roller also carried by said frame between said side members, lifting rockers pivotally attached adjacent one end to said load-lifting element and resting upon said roller, said lifting rockers being provided with flanges, means on said frame overhanging said flanges to prevent lateral tilting of said lifting rockers, said lifting rockers being constructed to assume a relatively supine attitude when said load-lifting element is down, and flexible means attached to the lower ends of said lifting rockers and passing over said roller for drawing said lifting rockers, by engagement with said roller into a relatively erect position, thereby raising said load-lifting element.

16. A lifting jack including a frame having spaced side members, a load-lifting element carried by said frame, a roller also carried by said frame between said side members, lifting rockers pivotally attached adjacent one end to said load lifting element, and resting against said roller, said lifting rockers being constructed to assume a relatively supine attitude when said load-lifting element is down, and being each provided with an external flange extending laterally along its lower border and an internal flange extending laterally along an intermediate part thereof, means on said side frame members overhanging said external flanges to prevent lateral tilting of said lifting rockers relative to said frame, and flexible means attached to the lower end of said lifting rocker for drawing the latter, by interengagement with said roller into a relatively erect position, thereby raising said load-lifting element, said flexible means bearing against said internal flanges and supporting part of the load carried by said load-lifting element.

17. A lifting jack including a frame having spaced side members, a load-lifting element carried by said frame, a roller also carried by said frame between said side members, lifting rockers pivotally attached adjacent one end to said load-lifting element and resting against said roller, said lifting rockers being constructed to assume a relatively supine attitude when said load-lifting element is down, said lifting rockers being provided with external flanges extending laterally along the lower borders thereof, means on said frame overhanging said flanges and cooperating with said roller to form a space for the passage of said flanges, to prevent lateral tilting of said lifting rockers, said flanges being formed with enlargements at their lower ends of too great size to enter said passages, the passage forming elements thereby forming a limit stop for the movement of said lifting rockers in one direction.

18. A lifting jack including a frame having spaced side members, a load-lifting element carried by said frame, a roller also carried by said frame between said side members, lifting rockers pivotally attached adjacent one end to said load-lifting element and resting against said roller, said lifting rockers being constucted to assume a relatively supine attitude when said load-lifting element is down, said lifting rockers being provided with external flanges extending laterally along the lower borders thereof, means on said frame overhanging said flanges and cooperating with said roller to form a space for the passage of said flanges, to prevent lateral tilting of said lifting rockers, said flanges being formed with enlargement at their lower ends of too great size to enter said passages, the passage forming elements thereby forming a limit stop for the movement of said lifting rockers in one direction and means attached to said lifting rocker for drawing the latter, by engagement with said roller, into a relatively erect position, thereby raising said load-lifting element.

19. A lifting jack including a load-lifting element, elevatable means for raising said load-lifting element, said means being arranged to assume a relatively supine attitude when the load-lifting element is down, means against which said elevatable means cams when operated to raise the load-lifting element, whereby said elevatable means is caused to change its direction with respect to the line of gravital force through the load, assuming a relatively erect position, operating mechanism connected to said elevatable means, said operating mechanism being provided with means compensating for the slight variation in mechanical advantage of said elevatable means incident to change in direction thereof, so as to operate under a substantially uniform power application through all stages of the load-lifting operation.

20. A lifting jack including a frame, a load lifting element carried by said frame, an axle supporting said frame at a point adjacent the free end of said load lifting element in spaced relation to the ground, elevatable means associated with said frame and connected to the free end of said load lifting element for raising the latter, said means being arranged to assume a relatively supine attitude when the load lifting element is down, means for operating said elevatable means, the latter being curved so as to maintain substantially constant the lifting component of the force applied to said operating means, but expediently departing from said curvature sufficiently to permit the free passage of a portion of said elevatable means beneath said axle, abutment means on said frame against which said elevatable means cams when operated to raise the load lifting element, whereby said elevatable means is caused to change its direction with respect to the line of gravital force through the load, assuming a relatively erect position.

21. A lifting jack including a frame, a load lifting element carried by said frame, an axle supporting said frame at a point adjacent the free end of said load lifting element in spaced relation to the ground, elevatable means associated with said frame and connected to the free end of said load lifting element for raising the latter, said means being arranged to assume a relatively supine attitude when the load lifting element is down, means for operating said elevatable means, the latter being curved so as to maintain substantially constant the lifting component of the force applied to said operating means, but expediently departing from said curvature sufficiently to permit the free passage of a portion of said means beneath said axle, abutment means on said frame against which said elevatable means cams when operated to raise the load lifting element, whereby said elevatable means is caused to change its direction with respect to the line of gravital force through the load, assuming a relatively erect position, said operating means including a flexible element attached to said elevatable means for drawing the latter by engagement with said abutment means into said relatively erect position, and a hub upon which said flexible element winds, said hub being eccentric to such degree, and in such direction as to compensate for the slight variation in the mechanical advantage of said elevatable means incident to the expediential departure from the ideal curved shape of said elevatable means.

22. A lifting jack including a ratchet wheel operably connected to load lifting mechanism, lifting and holding pawls engageable with teeth on said ratchet wheel and alternately carrying the load imposed thereupon, resilient means individual to and co-acting with the respective pawls and operable to engage them with the ratchet wheel and also operable to simultaneously urge said pawls toward release position, the force of said resilient means being less than that of the friction between that pawl and the engaged tooth which are at the time loaded, so that one pawl only responds to the release urge simultaneously imparted to both pawls by said resilient means, and means for setting said resilient means to respectively urge said pawls toward engaged or released position.

23. A lifting jack including a ratchet wheel operably connected to load lifting mechanism, lifting and holding pawls engagable with teeth on said ratchet wheel, and alternately carrying the load imposed upon said ratchet wheel, detent plates extending on opposite sides of the axes of rotation of said pawls and movable unitarily with said pawls, spring-pressed plungers engaging said detent plates and rockably mounted so as to be movable from one side to the other of said detent plates when operated, for moving said pawls into operative position or urging them to release position, the pressure of said plungers being less than that of the friction between that pawl and the engaged tooth, which are at the time loaded, so that one pawl only responds to the release urge simultaneously imparted to both pawls by said resilient means.

24. A lifting jack including a ratchet wheel journally supported, said ratchet wheel being operably connected to load lifting mechanism, a holding pawl engageable with teeth on said ratchet wheel, said pawl being provided with a detent plate, a fitting rockably mounted ex-axially of said ratchet wheel having a portion surrounding said ratchet wheel support but with lost motion therebetween, a spring-pressed plunger slidably housed within said fitting, said plunger engaging said detent plate and moving, when said fitting is rocked, from one side to the other of said detent plate for moving said pawl into operative position or urging it to release position, the pressure of said plunger being less than that of the frictional force between said pawl and the tooth engaged thereby when the load is supported by said pawl so that said pawl responds to the release urge of said plunger only when relieved from the load imposed upon said ratchet wheel, and a pull rod loosely attached to the surrounding portion.

25. A lifting jack including a ratchet wheel, said ratchet wheel being operably connected to said load lifting mechanism, a holding pawl engageable with teeth on said ratchet wheel, said pawl being provided with a detent plate, a fitting rockably mounted exaxially of said ratchet wheel having a grooved portion surrounding said ratchet wheel support, with lost motion therebetween, a spring-pressed plunger slidably housed within said fitting and engaging said detent plate, said plunger being movable, when said fitting is rocked, from one side of said detent plate to the other for moving said pawl into operative position or urging it into release position, the pressure of said plunger being less than the frictional force between said pawl and the tooth which it engages, so that said pawl responds to the release urge of said plunger only when relieved from the load on said ratchet wheel, and a pull rod having a portion rotatably mounted within the groove of said surrounding portion and lying on that side of the axis of said ratchet wheel opposite to said spring-pressed plunger.

26. A lifting jack including a load-lifting element, abutment means, a lifting rocker pivotally attached adjacent one end to said load-fitting element, and resting upon and riding longitudinally over said abutment means, said lifting rocker being constructed to assume a relatively supine attitude when said load-lifting element is down, and flexible means attached to the free end of said lifting rocker and resting on and riding longitudinally over said abutment means for drawing the rocker, by riding of the rocker and flexible means over said abutment means, into a relatively erect position, thereby raising said load-lifting element.

27. A lifting jack including a load lifting element and a support therefor, elevatable means for raising said load-lifting element, a ratchet wheel having a hub, a flexible connection between said elevatable means and said ratchet wheel windable upon said hub, cooperative stops on said support and ratchet wheel respectively for limiting rotation of the ratchet wheel in either direction, thereby determining the lifting range of said load lifting element, said stops being movable in a direction substantially circumferentially of the ratchet wheel after rotation-limiting engagement of said stops to permit rotation of said ratchet wheel through an angle greater than one revolution less the width of one of said stops.

28. A lifting jack including a frame, a load lifting element carried by said frame, elevatable means for raising said load-lifting element, a ratchet wheel having a hub, a flexible connection between said elevatable means and said ratchet wheel windable upon said hub, a lug on said ratchet wheel, the frame having an opening therein opposite to a side of the periphery of the ratchet wheel, a dog pivoted on the frame and movable across said opening and engageable with said lug, said lug and dog constituting a limit stop to rotation of the ratchet wheel in either direction, thereby determining the lifting range of said load lifting element, said dog being allowed sufficient movement in said opening to permit rotation of said ratchet wheel through an angle in excess of 360° less the width of the lug, in either direction.

29. A lifting jack comprising a frame, and a handle pivotally mounted with respect thereto and capable of oscillatory movement about its pivotal axis, supporting wheels adjacent one end of said frame, additional supporting means for said frame carried intermediate said wheels and handle, and means for latching said handle rigidly in substantially horizontal alinement with said frame whereby oscillatory movement of the handle in a downward direction will cause said jack to teeter on said additional supporting means.

30. A lifting jack comprising a frame, and a handle pivotally mounted with respect thereto and capable of oscillatory movement about its pivotal axis, supporting means adjacent one end of said frame, additional supporting means for said frame, carried intermediate said wheels and handle, a normally inoperative pawl on said handle engageable with cooperating means on said frame for latching said handle in rigid relation to said frame, against relative movement in one direction whereby oscillatory movement of the handle in said one direction will cause said jack to teeter on said additional supporting means.

31. A lifting jack, a handle oscillatably mounted thereupon and a keeper cooperating with said handle to yieldably hold the latter at an intermediate position in its range of oscillation.

32. A lifting jack, a handle oscillatably mounted therefor, a keeper plate yieldably engaging said handle, said keeper plate being formed with a recess positioned to receive and yieldably hold said handle at an intermediate position in its range of oscillation, the walls of said recess being shaped to oppose a less resistance to the escape of said handle from said keeper in one direction, than in the opposite direction.

33. A lifting jack including a frame, a handle oscillatably mounted with respect thereto, a keeper plate carried by said frame and yieldably engaging said handle, said keeper plate being formed with a recess positioned to receive and yieldably hold said handle at an intermediate position in its range of oscillation, the walls of said recess being shaped to offer less resistance to the escape of said handle from said keeper in a forward, than in a rearward direction, and the shape of the rearward wall of said recess being such as to resist a force transmitted through said handle, sufficient to push the jack before permitting escape of said handle in a rearward direction from between said keeper plate and frame.

34. A lifting jack including a frame having spaced side members, vehicle wheels carried externally of said frame in supporting relation thereto near its rearward end, a lever pivotally mounted in said frame having the rearward end thereof narrowed and extending substantially over the axis of said vehicle wheels, a load supporting member carried by the rearward end of said lever, and a pair of lifting rockers journalled externally of the narrowed end of said lever upon means projecting laterally from the sides thereof, and means carried between said frame members upon which said rocking lever rests and against which it cams, when operated.

35. A lifting jack including a load lifting element and a supporting frame therefor, elevatable means for raising said load lifting element, a ratchet wheel for actuating said means, a stop carried by said ratchet wheel, and a cooperative stop on said frame capable of moving a limited distance in either direction relatively to said frame in a direction substantally circumferentially of the ratchet wheel and with the stop on the ratchet wheel when engaged therewith to stop the rotation of the ratchet wheel and operative to limit the extent of rotation of the ratchet wheel in either direction.

36. A lifting jack comprising a frame having laterally spaced sides, a lever pivotally connected toward one end to the frame to swing upwardly therefrom, a load engaging element connected to the free end of said lever, a lifting member curved longitudinally and mounted to swing longitudinally in a curved path conforming with its longitudinal curvature in the space between the sides of the frame and beneath the load-engaging element and adapted when lowered to be accommodated substantially in the space between the sides of the frame when the load engaging element is lowered, said lifting member being movable into a position above the sides of the frame to raise the load engaging element, and means carried by the frame for actuating said member.

37. A lifting jack comprising a frame having laterally spaced side members, a lever pivotally connected at one end to the frame to swing upwardly therefrom, a load lifting element connected to the free end of said lever and adapted when lowered, to be accommodated substantially in the space between the side members of the frame and movable into a position above said side members when raised, a longitudinally arcuate member mounted to swing in an arcuate path conforming with its arcuate form between the side members of the frame and beneath the free end of said lever and operatively connected to the load lifting element to raise it, said member occupying a reclining position substantially between the side members of the frame, when the load lifting element is lowered, and projecting above said side members when the load lifting element is raised, and actuating means reciprocable longitudinally of the frame for swinging said member in its arcuate path.

38. A lifting jack comprising a frame having laterally spaced side members, a lever pivotally connected at one end to the frame to swing vertically in the space between its side members, a load lifting element connected to the free end of said lever and adapted, when lowered, to be accommodated substantially in the space between the side members of the frame and movable into a position above said side members when raised, a member having a longitudinally arcuate portion and mounted to swing said arcuate portion longitudinally in an arcuate path in the space between the side members of the frame and beneath the free end of said lever and operatively connected to the load lifting element to raise and lower it, said member occupying a reclining position substantially between the frame side members when the load lifting element is lowered and occupying an approximately erect position when the load lifting element is raised, and actuating means for swinging said member in its arcuate path.

39. A lifting jack comprising a frame, a load engaging element located toward one end thereof and movable into a position above the frame, a lever pivotally connected toward one end to the frame and connected at its free end to the load-engaging element, a lifting member having an arcuate portion and mounted on the frame to swing its said arcuate portion in an arcuate path concentric with said arcuate portion whereby said member may occupy a position substantially in parallelism with the frame when the load engaging element is lowered and may swing upwardly into angular relation with the frame to raise the load engaging element, and means operative longitudinally of the frame and cooperative with the arcuate portion of said member for swinging said lifting member.

40. A lifting jack comprising a frame embodying laterally spaced side members, a load lifting element, an elevatable member accommodated in the space between the side members of the frame and pivotally connected at one end to said element for raising it, said member having a portion which is arcuate in form, means cooperative with said member for supporting it for movement in a path which is substantially concentric with its arcuate form, and means extending longitudinally of the frame and cooperative with said member for elevating it.

41. A lifting jack comprising a frame embodying laterally spaced side members, a load lifting element, an elevatable member accommodated in the space between the side members of the frame and pivotally connected at one end to said element for raising it, said member having a portion which is arcuate in form, means cooperative with the arcute portion of said member for guiding it for movement in an arcuate path which coincides substantially with its arcuate form, and means cooperative with said member for elevating it.

42. A lifting jack comprising a frame embodying laterally spaced side members and having a supporting axle at one end, a lever pivoted at the opposite end of the frame to swing vertically between the side members thereof, a load lifting element connected to the free end of said lever, an elevatable member pivotally connected at one end to said lever adjacent to the free end of the latter and accommodated in the space between the side members of the frame and below the load-lifting element for raising said element, said member having a portion which is arcuate in form, means cooperative with the arcuate portion of said member for guiding it for movement in a path which conforms substantially with its arcuate form whereby said member will occupy a reclining position substantially between the side members of the frame and in approximate alinement therewith, when the load lifting element is lowered, and will assume a substantially erect position when the load lifting element is raised, and means cooperative with said member for elevating it.

43. A lifting jack comprising a frame embodying laterally spaced side members and having a supporting axle at one end, a lever pivoted at the opposite end of the frame with its free end adjacent to said axle, a load lifting element connected to the free end of said lever, an elevatable member accommodated in the space between the side members of the frame and below the load-lifting element for raising said element, said member having an arcuate portion and means for guiding it for movement bodily in a path which conforms substantially with its arcuate portion whereby said member will occupy a reclining position substantially between the side members of the frame when the load lifting element is lowered and will occupy a substantially erect position when the load lifting element is raised, and means cooperative with the arcuate portion of said member for elevating it.

44. A lifting jack comprising a frame having laterally spaced side members, a lever pivoted at one end to the frame to swing vertically, a load engaging element carried by the free end of said lever, a member accommodated in the space between the side members of the frame and embodying laterally spaced portions pivotally connected to said lever and mounted to swing in an arcuate path whereby they may lie substantially within the space between the side members of the frame and at the sides of the load-engaging element when the load engaging element is lowered and may swing upwardly to raise said load engaging member, and means cooperative with said member to swing it in said arcuate path and thereby elevate said load lifting member.

45. A lifting jack comprising a frame having means for supporting it at both ends and embodying laterally spaced sides, a load engaging element, a lifting member mounted to swing in an arcuate path in the space between the sides of the frame and embodying laterally spaced portions arranged at opposite sides of and pivotally connected to said load engaging element for raising it, and actuating means for said member extending longitudinally of the frame and cooperative with said member.

46. A lifting jack comprising a frame having supporting means at both ends and embodying laterally spaced sides, a load lifting element, a member embodying laterally spaced portions of substantially arcuate form mounted to swing in an arcuate path concentric with their arcuate form in the space between the sides of the frame and operatively connected to and arranged at opposite sides of said load lifting element, and means cooperative with said member for actuating it, said member being movable into a position where its laterally spaced portions lie between the frame side members and at opposite sides of the load lifting element when the latter is relatively lowered and movable into a position to project above said side members when the load lifting element is raised.

47. A lifting jack comprising a frame, a load engaging element, a lifting member embodying a pair of laterally spaced portions of arcuate form operatively connected to said load engaging element and mounted at opposite sides of the load-engaging element to swing vertically relatively to the frame, said member having means for guiding it into a position in substantial parallelism with the frame with its laterally spaced portions at opposite sides of the load engaging element when said element is lowered and for guiding it to swing upwardly in a path substantially concentric with the arcuate form of its laterally spaced portions into an angular position relatively to the frame to raise the load engaging element, and means for forcing said member upwardly to raise the load engaging element.

In testimony whereof I have hereunto set my hand.

ERNEST W. HOLMES.